May 9, 1967
R. R. NEEBEL ETAL
3,318,438
VERTICAL AUGER LOADER
Filed July 29, 1965
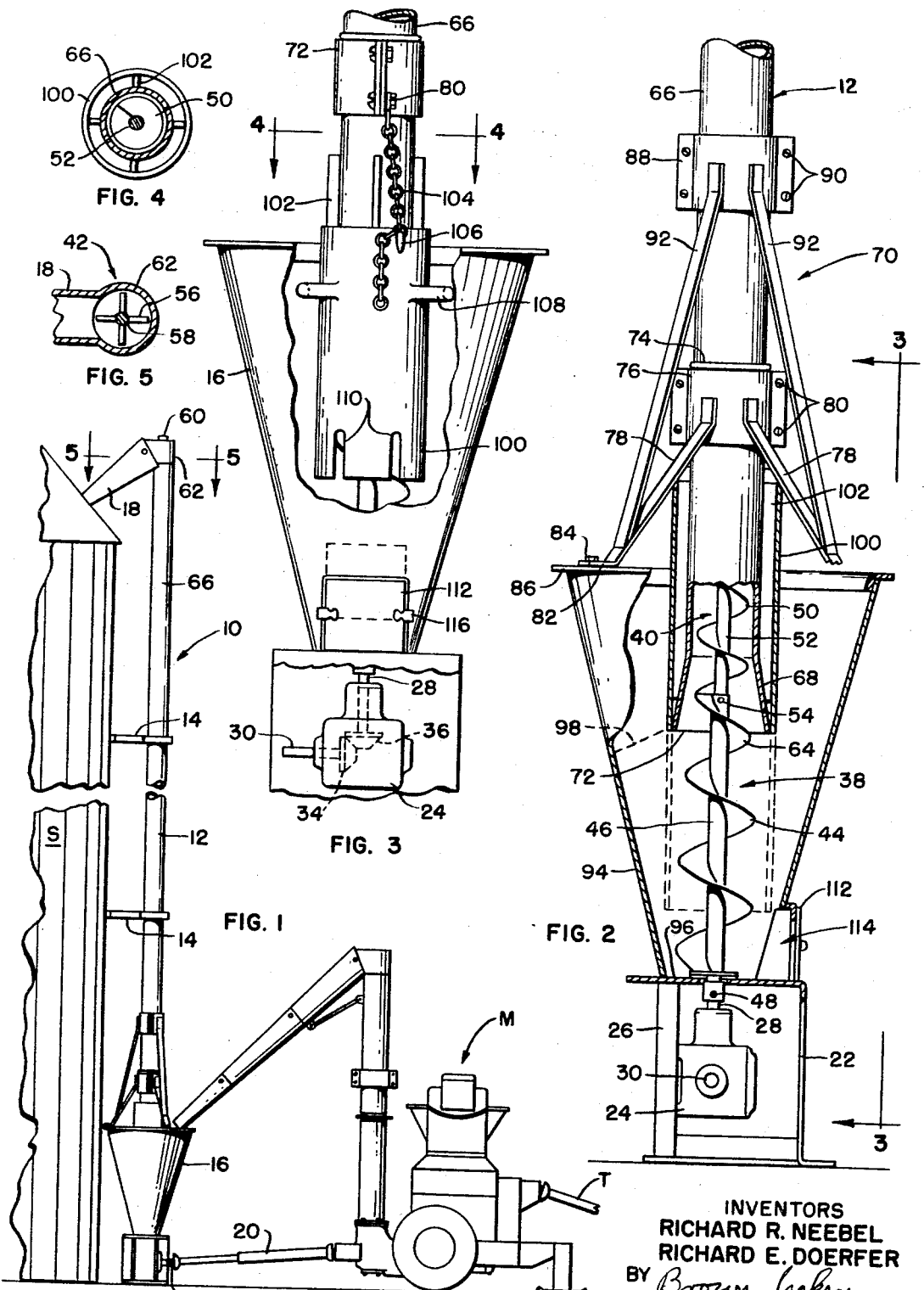
INVENTORS
RICHARD R. NEEBEL
RICHARD E. DOERFER
BY
ATTORNEYS

United States Patent Office 3,318,438
Patented May 9, 1967

3,318,438
VERTICAL AUGER LOADER
Richard R. Neebel and Richard E. Doerfer, Cedar Falls, Iowa, assignors to Kewanee Machinery & Conveyor Company, Kewanee, Ill., a corporation of Illinois
Filed July 29, 1965, Ser. No. 475,755
13 Claims. (Cl. 198—64)

This invention relates to a vertical lift conveyor of the screw auger type which is particularly useful in the handling of free flowing bulk materials, for example, to top load a silo with corn-and-cob meal, shelled and/or cracked corn, soy beans, as well as a variety of other small grains and similar granular material.

Although screw conveyors have long been used in agriculture and by industry to transfer bulk materials from one location to another, in the past when operated in a vertical position such conveyors were considered to be inefficient and of low capacity.

A principal object of the present invention is to provide a construction of vertical lift auger conveyor which can be operated efficiently and at nearly its full capacity.

Another and more specific object of the invention is to provide novel and improved loading structure for a vertical lift auger conveyor which will materially increase the conveying capacity of the auger while avoiding the problems of "bridging" which characterized many of the previously used arrangements for loading vertical lift auger type conveyors.

It is a feature of the present invention that the intake flighting of the auger are loaded from a conically shaped loading hopper having a steeply sloped wall which completely surrounds the intake flightings and so spaced therefrom as to induce a wedge type feeding action of the corn or other granular material onto the auger intake flightings.

We have found, and it is therefore a further feature of the present invention, that by loading the intake flightings of the auger from a hopper of conical shape and one having its sidewall both steeply sloped and also completely surrounding the intake flightings of the auger for a height equal to several flightings, we are able to effect a swirling action or feed onto the intake flights. In those instances where we have employed other than conical shaped hoppers for example, square or hexagonal shaped hoppers, or located the auger other than centrally of the hopper, we have found evidence of bridging and interference with the free flow of the materials onto the intake flightings of the auger.

We have also found that both the slope and spacing of the conical shaped sidewall of the hopper, as well as the exposure height of the intake flightings of the auger must be carefully related, at least to the extent that the wedge type feeding action induced by the hopper wall significantly exceeds the centrifugal force of the auger itself. Thus, we have found that the height of the auger intake flightings ought to equal from two to three times the diameter thereof, and that the slope of the conical hopper should not only extend above the height of the intake flightings but that the hopper sidewall should so steeply slope as to approximate the diameter of the auger at its base or only slightly exceed the same and still leave a space about the intake flightings at the top thereof which is of the order of three-quarter the diamter of the auger intake flightings. By observing such relationships, we have found that we are able to obtain a minimum loading of the intake flighting to about 50% of their capacity. This represents a further feature and important object of the invention.

We have also found where we make the diameter of the intake flightings nearly one-half again as large as the diameter of the conveyor flightings, and provide a transitional flighting between the conveyor flightings and the intake or loading flightings disposed below, we are able to effect a supercharging of the conveyor housing of the conveyor section of the auger to nearly 90% of its capacity. The most satisfactory results have been noted where the transitional section is equal to about one flighting or approximates nine-tenths the diameter of the intake flightings. These represent further features and other important objects of the invention.

Thus it is a further and important feature of our invention that we provide a vertical lift auger in which the lower intake flights are fed from a steeply sloped conical hopper and the load of which intake flights are force fed and/or super-charged through a transitional section of the auger to smaller diametered and enclosing flightings comprising the remainder or conveyor section of the auger.

It is a further feature of our invention that by controlling the axial length of this transitional flight of the auger as well as its enclosure by the conveyor housing and the related diameters of the intake and conveyor flightings of the auger we are able to minimize loss of efficiency through spillage and/or slip back in packing the conveyor flights while still allowing sufficient time for non-free flowing materials to rearrange their particle configuration but without such a dense packing or wedging as to be detrimental to the unloading of the granules at the top of the conveyor section of the auger.

Another feature of the invention is the provision of means for varying the exposure height of the intake flightings and thereby the intake rate of the auger. In the accomplishment thereof the invention contemplates the provision of a slip tube about the lower end of the housing which encloses the conveyor flight section of the auger, and may be lowered about the intake flightings of the auger to permit varying the exposure height thereof and thereby the intake rate of the conveyor. For example we have found that it is important to be able to adjust the exposure height of the auger intake flightings to satisfy torque requirements of the different prime movers on which we may rely to turn the auger. We have also found that it is important to be able to vary the intake rate in accordance with the moisture content and consistency of grain being fed through the conveyor.

Thus, it is a feature of the present invention that we are able to adjust the intake of the vertical lift conveyor and thereby to regulate the flow of grain both to the auger and also the delivery by the auger of its load to the silo or other receiving area.

Still another feature of the invention is the noval construction we provide by which the slip tube is adapted to prevent material from wedging between the telescoping tube and the transition section and wherefore the construction is substantially self-cleaning.

Still another feature of the invention is the provision of an access opening at the base of the hopper which may be used for removal of excess or foreign materials, such as snow, ice, etc., and which may be left open in non-use to avoid accumulation of water and possible damage to the conveyor.

Still another object of the invention and/or feature thereof is the provision of a feed or loading arrangement for a vertical lift auger type conveyor which is of simple construction but highly efficient in its operation, which is also lightweight and therefore easily maneuverable, and at the same time is both rigid and rugged in its construction.

Many other objects and advantages and/or features of the invention will be apparent or will become so after consideration of the preferred embodiment of the invention which will now be described in connection with the accompanying drawings.

Referring now to said drawings:

FIGURE 1 illustrates the invention mounted to a silo and connected to a roll mill for loading the silo with cracked or shelled corn as it is obtained from the roll mill;

FIGURE 2 is an enlarged sectional and partially fragmented vertical view of the feed or intake end of the auger and its loading hopper;

FIGURE 3 is a partially fragmented view generally similar to FIGURE 2 but taken at substantially right angles thereto, as indicated by lines 3—3, looking in the direction indicated by the arrows;

FIGURE 4 is a sectional view taken along lines 4—4 of FIGURE 3, looking in the direction indicated by the arrows; and FIGURE 5 is an enlarged sectional view taken through the top section of the conveyor along lines 5—5 of FIGURE 1.

Referring now more specifically to the several views wherein like parts are identified by like reference numerals, and first to FIGURE 1, the invention is indicated generally at 10, comprising an enclosed vertical lift auger 12 attached as by hanger brackets 14 to the wall of a silo S, its lower end being based in a conically shaped loading hopper 16 and its upper end having a discharge spout 18 which is directed downwardly through a provided opening in the top of the silo. M represents a roller mill adapted, for example, to shell or crack corn which it discharges through its spout into the top of loading hopper 16. Roller mill M is powered by a tractor, not shown, to which it is connected as by a tumbling rod T. As will hereinafter be made more clear, the vertical lift auger 12 of the present invention turns axially about the vertical axis of hopper 16 in which it is centered to effect its lifting function and power therefor may be derived from shielded tumbling rod 20 operated off the roller mill in such fashion that the one tractor is used to drive both the mill M and the silo loading auger 12. Alternatively, the silo auger can be operated by connecting tumbling rod 20 directly to the tractor or it can be rotated by an electric or other powered motor.

Referring therefore now more particularly to FIGURES 2 and 3, hopper 16 is shown rigidly mounted on base 22 as by weldments. Supported beneath plate 22 is gear box 24 as by bolting to vertical member 26, said gear box including a vertically disposed output shaft 28 and a horizontally disposed power take-off shaft 30. Output shaft 28 serves for connection to the vertical lift auger 12 and power take off shaft 30 to which tumbling rod 20 connects as by pin 32 is drivingly connected to output shaft 28 through a pair of meshing beveled gears 34 and 36 (FIGURE 3).

Referring now to FIGURE 2, vertical lift auger 12 is illustrated as comprising a boot or loading section 38, one or more intermediate sections 40 connected in tandem to obtain the required height of the vertical lift conveyor and a top or discharge section 42 (FIGURE 5). Boot section 38 as shown comprises two and one-half flightings 44, each of a constant diameter and corresponding pitch which in the preferred form of the invention approximates eight inches. Flightings 44 are spirally arranged about a shaft section 46 which extends through a provided opening in base plate 22 and is attached to the vertical output shaft 28 of gear box 24 as by bolt 48. The intermediate or conveying sections 40 of the auger 12 comprise flightings 50 spirally arranged about shaft 52 and detachably connected to the upper end of shaft 46 of the boot section as by bolt or pin 54. Flightings 50 of the conveyor section have a constant diameter and corresponding pitch smaller than the diameter of the flightings 44 of the boot section of the auger. For example in an auger according to the invention where the intake flightings 44 have a diameter and pitch of about 8 inches, flightings 52 will have a diameter and corresponding pitch of about 6 inches or approximately 71% of the intake flighting diameter.

The upper or discharge section 42 of the auger as shown in FIGURE 5 comprises paddles 56 supported on a shaft 58. Shaft 58 is connected at its lower end to the top end of shaft 52 of the conveyor sections so as to turn therewith and has its upper end rotatably connected in bearing lock collar 60 (FIG. 1), mounted on the top of the conveyor housing 62 and providing stability to the auger assembly.

As illustrated in FIGURE 2, the boot or loading section 38 of the auger also includes a transistional flighting 64 which although having a pitch approximating that of flightings 44 has a diameter which progressively decreases from 8 to 6 inches so that the flightings 44 of the loading section effectively merge into the flightings 50 of the conveyor section.

As illustrated in FIGURE 2, the conveyor sections 40 of the auger are enclosed by a cylindrical housing 66 which is joined to housing 62 of the upper or discharge section of the auger conveyor 10. Housing 66 is essentially of constant diameter throughout its length, having an internal diameter only slightly larger than the O.D. of the conveyor section flightings 50. For example, the I.D. of housing 66 will preferably comprise from about 1.10 to 1.18 times the O.D. of the conveyor flightings 50. The lower end of the conveyor housing 66 however flares outwardly to define a conical shape 68 matching the conical shape of the transitional flighting 64 over which it partially extends and so as to leave approximately the same amount of clearance thereabout. Conical shaped housing portion 68 which serves to partially enclose transitional flighting 64 will therefore have an axial length approximating the corresponding dimension of the flighting or about .90 times the O.D. of the load flightings 44 of the auger boot section 38. As noted, the inner diameter of sleeve 66 need only exceed the outer diameter of the conveyor flightings 50 by an amount sufficient to assure smooth and uninterrupted rotation of the flightings in the rotation of their shafts and for similar reasons flared section 68 will have an inner diameter expanding from a dimension approximately 1.1 to 1.18 times the diameter of the flightings 50 of the upper section 40 to a maximum diameter approximately 1.07 to 1.13 times the outer diameter of the flightings 44 of the lower or boot section of the auger 38.

For maximum efficiency in loading the auger 10, flightings 44 and at least some portion (up to about one-half) of the transistional flighting 64 of the boot section are left uncovered. For this purpose we provide structure indicated generally at 70 for accurately locating the bottom edge 72 of the conveyor housing at a predetermined fixed distance or height over the bottom wall of the hopper defined by base plate 22. In one embodiment the height has been calculated to approximate 2.86 times the O.D. of the load flightings 44 of the auger and it is our present experience that this height is critical particularly when related to the dimensions of the loading hopper 16 as will be later described. In order to accurately locate the conveyor housing 66 at this height, we provide housing 66 with a locating stop 74 by means of which it rests on the lower half bands 76 of the mentioned supporting structure 70 which will now be described. This supporting structure 70 which also serves in conjunction with the previously described hanger brackets 14 to support conveyor tube 66 and thereby the auger 12 both vertically and in proper aligned relation with respect to the hopper 16 and silo comprises legs or braces 78 preferably three in number and spaced at 120° apart about tube 66, two of which appear in FIGURE 2. The upper end of braces 78 are welded or otherwise rigidly attached to the mentioned half-band clamps 76 against which stop 74 rests, these half-band clamps being bolted together as at 80. The lower ends of said braces 78 include an outwardly angled foot 82 bolted as at 84 to the upper edge 86 of the hopper 16 which may comprise a separately formed part welded thereto. Spaced above half-band clamps 76 and encircling housing 66 is a second pair of half-band clamps 88 which are similarly connected together as by bolts 90. Welded to half-band clamps 88 and the first mentioned braces 78 immediately above the bolted feet 82 thereof are further reinforcing braces 92 which function with braces 78 to provide an extremely rigid supporting structure for housing 66 on hopper 16 and one which resists both axial slippage and lateral sway.

For efficient loading of the intake flighting 44 from hopper 16 as described, its sidewall 94 is illustrated as rising above edge 72 of the conveyor housing 66 to an overall height equal to at least 4.57 times the diameter of the intake flightings 44. The hopper sidewall 94 is also steeply sloped so that a stand of shelled corn or other grain fed into the top of hopper 16 as from roll mill M (FIG. 1) to above the level of the intake flightings will enforce a nearly perpendicular gravital loading of the flightings 44 of the auger. Purposely, also the hopper sidewall 94 is sloped inwardly to a diameter approaching that of the intake flightings 44 at its bottom wall 96 from which the auger rises (approximately 1.07 to 1.13 times the diameter of said flightings 44 which is sufficient to provide clearance for rotation of the auger). For example in one form of the invention the hopper sidewall 94 is angled at about 16° off vertical. Considering the gravital forces exerted by the stand of corn above the intake flightings to substantially parallel the slope of the hopper wall, it will be appreciated that the intake flightings 44 are therefore being effectively loaded from an annular wedge which may be considered conical in shape or as having a right triangular shape in cross section. The height of this wedge corresponds to the height of edge 72 of the conveyor section housing from the bottom wall 96 of the hopper and has a maximum width at its top equal to about .78 of the intake flighting diameter as is indicated by dotted line 98 which is drawn from edge 72 of the conveyor section housing perpendicular to the hopper wall 94. In one embodiment of the invention employing intake flightings of 8-inch diameter and pitch, we have found that a hopper having these related dimensions to the auger loaded the auger intake flightings to at least 50% of their capacity when the auger was rotated at about 540 r.p.m. and that the effective swirling of the wedge about the flightings derived from the rotating auger flightings coupled with the sharp acclivity of the hopper wall avoided bridging of the corn or other granules loaded in to the hopper. Furthermore the transistion flighting 64 effectively supercharged the 6-inch diameter flightings of the conveyor section to nearly 90% of their capacity with the result that we have been able to load a silo with our vertical lift conveyor operating at a rate up to 1800 bushels per hour and without regard to the height of the silo.

Under certain circumstances where it is necessary or desirable to rotate the auger by means other than a tractor, for example an electric motor, it may be desirable to operate the auger lift conveyor at less than its maximum capacity. The invention therefore also contemplates means by which the exposure of the flightings 44 or the intake of the auger may be adjusted to regulate the flow or feed rate of the auger. Such means are illustrated as comprising a cylindrical slip tube 100 having an internal diameter approximating that of the conveyor housing edge 72 over which it fits (approximates 1.07–1.13 times the diameter of the intake flightings). Slip tube or sleeve 100 also is of a length such that it may be slid axially over the conveyor housing to partially or fully enclose the intake flightings 44. In its fully lowered position tube 100 engages the hopper bottom wall 96 and is of a length such that it still retains its sliding engagement with conveyor housing edge 72. Preferably the conveyor housing 66 is also provided with peripherally spaced and axially extending guides 102 on which tube 100 engages in its retracted or raised position. Means are also provided in the form of a chain 104 attached by one of its links to one of bolts 80 used to secure half-clamps 72 to the conveyor housing 66. On sleeve 100 is a hook 106 which engages in one of the links of chain 104 to locate the slip tube 100 at a desired height from the bottom wall 96 of the hopper 16, thus permitting regulation of the intake of the auger lift conveyor 10. Sleeve 100 may also be provided with a pair of handles 108 for the operator's convenience in raising and lowering the sleeve. The lower edge of sleeve 100 is also shown provided with spaced slits or slots 110 which impart a flexibility to the edge of the sleeve to prevent granular particles from wedging between the telescoping tube and the transition section 68 of the conveyor housing.

A clean out door 112 is also provided to removably cover an access opening 114 in the hopper sidewall adjacent the base thereof. Such facilitates removal of excess or foreign materials such as snow or ice, etc. As illustrated, door 112 comprises a plate removably held in place over opening 114 and against the rim thereof by a pair of resilient latches 116. However, any other means of mounting door 112 over opening 114 may be employed. One advantage of the disclosed arrangement is that the door may be raised up to the height of the latches without separation from the hopper wall and be resiliently held in place. It may be also completely separated from the hopper wall by deflecting it forward to miss the angle of the hopper wall as it is raised, the resiliency of the latches accommodating this action.

It will be appreciated that many other arrangements as well as rearrangements of the parts described as comprising the invention as well as other modification may be had within the spirit of the invention. From the illustrated and described embodiment it will however also be apparent that all of the recited objects, advantages and features of the invention are seen as obtainable in a highly practicable and convenient manner.

Thus having described our invention, we claim:

1. A vertical lift auger-type conveyor comprising in combination, a conical shaped loading hopper having a steeply sloped sidewall, an auger rotatably supported on the bottom wall of the auger to turn about the vertical axis thereof, the lower flightings of the auger being adapted for loading from the hopper, the remaining upper flightings of the auger being enclosed by a tube and constituting the conveying section of the auger, the tube being supported by the hopper against rotation, a slip tube slidably supported on the lower end of the tube to variably enclose the load flightings of the auger and means for releasably supporting the slip tube at selected heights relative to the bottom wall of the hopper to permit adjusting the loading rate of the auger.

2. A vertical lift auger-type conveyor as claimed in claim 1 wherein the slip tube has spaced slots in its lower edge.

3. A vertical lift auger-type conveyor as claimed in claim 1 wherein the loading hopper includes a closeable access opening adjacent its bottom wall.

4. A vertical lift auger-type conveyor as claimed in claim 1, wherein the hopper wall is so angled as to permit nearly vertical loading of its lower flightings below the tube enclosing the conveyor section of the auger, the sidewall of the hopper being uniformly disposed about the auger lower flightings and at a distance therefrom equal to less than their diameter.

5. A vertical lift auger-type conveyor as claimed in claim 1, wherein the diameter of the tube enclosed flightings of the conveyor section of the auger is less than the diameter of the lower flightings, and an intermediate flighting between the upper and lower flightings having a diminishing diameter which merges the diameter of the lower flightings into the conveyor section flightings to effect super charging of the load passed thereto from the lower flightings.

6. A vertical lift auger-type conveyor as claimed in claim 7 wherein the loading hopper is provided with a closeable access opening adjacent the bottom wall thereof.

7. A vertical lift auger-type conveyor comprising a top loading hopper having a closed bottom wall and a steep inwardly sloped sidewall of inverted frusto-conical shape thereabout, and a vertical auger rotatably supported on the bottom wall of the hopper and rising centrally thereof to turn about the vertical axis of the hopper, the lower flightings of the auger within the hopper being of the same diameter and exposed all around to a height off the bottom wall in the order of 2 to 3 times their diameter constituting the intake section of the auger, the upper flightings of the auger being enclosed all around constituting a conveying section of smaller diameter, the auger having at least one intermediately disposed transition flighting which diminishes in diameter from that of the intake flightings to that of the conveyor flightings so as to effect more fully packing the conveyor flightings with material transferred thereto from the intake flightings during rotation of the auger, and the acclivity of the hopper sidewall being such as to provide an annular loading space of uniform vertical wedge section about the exposed intake section flightings which loading space progressively increases in width thereabove to the top of the hopper so as to enforce gravital loading of the intake flightings through the full height thereof.

8. A vertical lift auger as claimed in claim 7, wherein the acclivity of the hopper sidewall is about sixteen degrees off vertical.

9. A vertical lift auger-type conveyor comprising a conical loading hopper having a steep inwardly sloped sidewall, and a vertical auger rotatably supported centrally of the bottom wall of the hopper to turn about the vertical axis of the hopper, the lower flightings of the auger within the hopper being of the same diameter and constituting the intake section of the auger, the upper flightings thereof constituting a conveying section of smaller diameter, the auger having at least one intermediately disposed transition flighting which diminishes in diameter from that of the intake flightings to that of the conveyor flights so as to effect more fully packing of the conveyor flightings with material transferred thereto from the intake flightings during rotation of the auger, a conveyor housing closely surrounding the conveyor flightings and at least a portion of the transition flighting, the intake flightings being encloseable by a slip tube slidably mounted on the lower end of the conveyor housing, and means for supporting the slip tube at different heights from the bottom wall of the hopper to permit varying the intake of the auger.

10. A vertical lift auger-type conveyor as claimed in claim 9 wherein the hopper is provided with a closeable access opening adjacent the bottom wall thereof.

11. A vertical lift auger-type conveyor as claimed in claim 9 wherein the slip tube is provided with spaced axially directed slits interrupting the bottom edge thereof.

12. A vertical lift auger conveyor for filling silos and the like comprising a top loading hopper having an inverted frusto-conical sidewall and a circular shaped closed bottom wall, an auger rotatably supported on said bottom wall to turn about the vertical axis of said hopper, said auger including a bottom loading section having a diameter only slightly smaller than that of the hopper bottom wall, an upper conveying section having a diameter less than the diameter of the loading section and a transitional intermediate section having a diameter which diminishes from that of the loading section to that of the conveying section, a conveyor housing enclosing said conveying section of the auger and having an outwardly flared bottom portion of an axial length approximating the axial length of the intermediate section of the auger and terminating short of the upper end of the loading section of the auger so as to leave exposed the loading section and the lower portion of the intermediate section of the auger, said flared bottom portion of the housing only slightly exceeding the diameter of the loading section, said loading section having its flightings exposed all around to a height off the bottom wall of the hopper in the order of 2 to 3 times its diameter, and the sidewall of the hopper extending to a height above said flared bottom portion and at an angle such as to provide an annular loading space of uniform wedge shape in vertical section about the exposed bottom loading section of the auger having a width in the order of three-quarters the diameter of the loading section, said annular loading space progressively increasing in width to adjacent the top of the hopper whereby nearly vertical gravital loading of the intake section of the auger is enforced uniformly thereabout.

13. A vertical lift auger conveyor for filling silos and the like comprising an inverted frusto-conical loading hopper having a circular shaped bottom wall, and an auger rotatably supported in said bottom wall to turn about the vertical axis of said hopper, said auger including a bottom loading section having a diameter smaller than that of the hopper bottom wall, the diameter of the hopper bottom wall being 1.13A when the diameter of the auger loading section is considered as A, said auger also including an upper conveying section having a diameter of .71A and a transitional intermediate section having a diameter which diminishes from that of the loading section to that of the conveying section, said transitional section having an axial length of .90A, a conveyor housing enclosing said conveying section of the auger and having an outwardly flared bottom portion of an axial length approximating the axial length of the intermediate section of the auger, the lower edge of the conveyor housing having a diameter of 1.07–1.13A and terminating short of the upper end of the loading section of the auger so as to leave the loading section and the lower portion of the intermediate section of the auger exposed to a height of 2.68A from the bottom wall of the hopper, the sidewalls of the hopper extending to a height above said transitional section and at an angle such as to provide a wedge shaped annular loading space about the exposed bottom loading section of the auger having a width less than the diameter of the loading section, the distance of the lower edge of the conveyor considered at right angles to the hopper sidewall being .78A and the height of the hopper wall at least 4.57A.

References Cited by the Examiner

UNITED STATES PATENTS

| | | | |
|---|---|---|---|
| 511,852 | 12/1895 | Desgoffe | 198—213 |
| 1,882,820 | 10/1932 | Haines | 198—64 |
| 2,517,456 | 8/1950 | Wherrett | 214—83.32 X |
| 2,980,407 | 4/1961 | Luscombe | 198—64 X |

EVON C. BLUNK, *Primary Examiner.*

EDWARD A. SROKA, *Examiner.*